(12) United States Patent
Pathiyal

(10) Patent No.: US 9,743,278 B2
(45) Date of Patent: *Aug. 22, 2017

(54) SECURITY INTERFACE FOR A MOBILE DEVICE

(71) Applicant: BlackBerry Limited, Waterloo (CA)

(72) Inventor: Krishna K. Pathiyal, Parkland, FL (US)

(73) Assignee: BlackBerry Limited, Waterloo, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/707,103

(22) Filed: Dec. 6, 2012

(65) Prior Publication Data

US 2013/0097672 A1    Apr. 18, 2013

Related U.S. Application Data

(63) Continuation of application No. 10/327,754, filed on Dec. 23, 2002, now Pat. No. 8,347,104.

(Continued)

(51) Int. Cl.
  *G06F 7/04* (2006.01)
  *H04W 12/06* (2009.01)
  (Continued)

(52) U.S. Cl.
  CPC ........ *H04W 12/06* (2013.01); *G06F 21/6218* (2013.01); *H04L 63/105* (2013.01);
  (Continued)

(58) Field of Classification Search
  CPC .............................................. H04L 29/06823
  (Continued)

(56) References Cited

U.S. PATENT DOCUMENTS 5,802,275 A     9/1998  Blonder
6,084,969 A  *  7/2000  Wright ................ H04L 63/0464
                                                  340/7.21

(Continued)

FOREIGN PATENT DOCUMENTS

EP     0952511 A2    10/1999
WO     0062228 A2    10/2000
(Continued)

OTHER PUBLICATIONS

Pathiyal, Krishna, K.; U.S. Appl. No. 10/327,754, filed Dec. 23, 2002; Title: Security Interface for a Mobile Device.
(Continued)

*Primary Examiner* — Christopher Brown
(74) *Attorney, Agent, or Firm* — Conley Rose, P.C.; J. Robert Brown, Jr.; Albert A. Abbou (57) ABSTRACT

A method and device are described which provide a security interface, preferably for a mobile device. The security interface provides user-selectable non-secure data that is displayed without the need for a password. The non-secure data is preferably updated on a regular basis, and can be obtained from different sources, as selected by a user. The secure data can be accessed after successful authentication, such as a positive password verification. Additional non-secure data, related to the displayed non-secure data, can preferably be accessed, with or without a need for a password. An indication can be provided to inform a user that secure data has been updated, without the need to access such secure data. The security interface is preferably enabled after a predetermined timeout period. The interface allows the device to operate in three data access states: a controlled access state; a verification state; and a full access state.

19 Claims, 6 Drawing Sheets

Related U.S. Application Data (60) Provisional application No. 60/342,135, filed on Dec. 26, 2001.

(51) Int. Cl.

| | |
|---|---|
| *G06F 21/62* | (2013.01) |
| *H04L 29/06* | (2006.01) |
| *H04M 1/725* | (2006.01) |
| *H04W 12/08* | (2009.01) |
| *H04L 29/08* | (2006.01) |
| *H04M 1/66* | (2006.01) |
| *H04W 88/02* | (2009.01) |

(52) U.S. Cl.
CPC ............. *H04L 67/00* (2013.01); *H04L 67/04* (2013.01); *H04M 1/72547* (2013.01); *H04W 12/08* (2013.01); *G06F 2221/2101* (2013.01); *G06F 2221/2105* (2013.01); *G06F 2221/2137* (2013.01); *H04M 1/66* (2013.01); *H04W 88/02* (2013.01)

(58) Field of Classification Search
USPC ............................................. 713/182; 726/27
See application file for complete search history.

(56) References Cited

U.S. PATENT DOCUMENTS

| | | | |
|---|---|---|---|
| 6,296,191 B1 | 10/2001 | Hamann et al. | |
| 6,516,421 B1* | 2/2003 | Peters | 713/502 |
| 6,583,714 B1* | 6/2003 | Gabou | H04M 1/673 340/5.51 |
| 6,727,930 B2* | 4/2004 | Currans et al. | 715/864 |
| 7,024,690 B1 | 4/2006 | Young et al. | |
| 7,529,704 B1 | 5/2009 | Breslow et al. | |
| 7,587,350 B1 | 9/2009 | Stewart et al. | |
| 2001/0022839 A1 | 9/2001 | Ishigaki | |
| 2001/0025224 A1 | 9/2001 | Schneider et al. | |
| 2001/0053688 A1 | 12/2001 | Rignell et al. | |
| 2002/0042288 A1* | 4/2002 | Nakayama | 455/553 |
| 2002/0066039 A1 | 5/2002 | Dent | |
| 2002/0073340 A1 | 6/2002 | Mambakkam et al. | |
| 2002/0076004 A1 | 6/2002 | Brockenbrough et al. | |
| 2002/0091762 A1* | 7/2002 | Sohn et al. | 709/203 |
| 2002/0137530 A1 | 9/2002 | Karve | |
| 2003/0046533 A1* | 3/2003 | Olkin et al. | 713/152 |
| 2003/0061503 A1 | 3/2003 | Katz et al. | |
| 2003/0074204 A1 | 4/2003 | Krothapalli et al. | |
| 2003/0093794 A1 | 5/2003 | Thomas et al. | |
| 2003/0097596 A1* | 5/2003 | Muratov | G06F 21/31 726/26 |
| 2003/0142364 A1 | 7/2003 | Goldstone | |

FOREIGN PATENT DOCUMENTS

| | | |
|---|---|---|
| WO | 0150317 A2 | 7/2001 |
| WO | 0152572 A1 | 7/2001 |
| WO | 0182621 A1 | 11/2001 |

OTHER PUBLICATIONS

Office Action dated Apr. 27, 2006; U.S. Appl. No. 10/327,754, filed Dec. 23, 2002; 11 pages.
Final Office Action dated Nov. 13, 2006; U.S. Appl. No. 10/327,754, filed Dec. 23, 2002; 10 pages.
Office Action dated May 25, 2007; U.S. Appl. No. 10/327,754, filed Dec. 23, 2002; 9 pages.
Office Action dated May 28, 2008; U.S. Appl. No. 10/327,754, filed Dec. 23, 2002; 10 pages.
Office Action dated Dec. 31, 2008; U.S. Appl. No. 10/327,754, filed Dec. 23, 2002; 11 pages.
Final Office Action dated Nov. 2, 2009; U.S. Appl. No. 10/327,754, filed Dec. 23, 2002; 10 pages.
Advisory Action dated Jan. 4, 2010; U.S. Appl. No. 10/327,754, filed Dec. 23, 2002; 3 pages.
Office Action dated Nov. 9, 2010; U.S. Appl. No. 10/327,754, filed Dec. 23, 2002; 12 pages.
Office Action dated Apr. 26, 2011; U.S. Appl. No. 10/327,754, filed Dec. 23, 2002; 9 pages.
Final Office Action dated Oct. 4, 2011; U.S. Appl. No. 10/327,754, filed Dec. 23, 2002; 11 pages.
Advisory Action dated Dec. 12, 2011; U.S. Appl. No. 10/327,754, filed Dec. 23, 2002; 5 pages.
Notice of Allowance dated Aug. 16, 2012; U.S. Appl. No. 10/327,754, filed Dec. 23, 2002; 7 pages.
Canadian Office Action; Application No. 2,414,964; Jul. 3, 2007; 3 pages.
Canadian Office Action; Application No. 2,414,964; Apr. 8, 2009; 3 pages.
Canadian Office Action; Application No. 2,414,964; Jul. 15, 2010; 3 pages.
Canadian Office Action; Application No. 2,414,964; Nov. 1, 2011; 2 pages.
Canadian Office Action; Application No. 2,414,964; Oct. 19, 2012; 2 pages.
Canadian Office Action; Application No. 2,414,964; Feb. 26, 2016; 4 pages.
Canadian Office Action; Application No. 2,414,964; Mar. 12, 2015; 4 pages.
Canadian Office Action; Application No. 2,414,964; Jan. 31, 2014; 2 pages.
Canadian Office Action; Application No. 2,414,964; dated Mar. 28, 2017; 3 pages.

\* cited by examiner

SECURITY INTERFACE FOR A MOBILE DEVICE

FIELD OF THE INVENTION

This invention relates to the field of user interfaces for mobile devices. In particular this invention relates to controlling user access for a mobile device.

BACKGROUND OF THE INVENTION

Many mobile devices, such as cellular telephones, personal digital assistants (PDAs), and other handheld computing and communicating devices, currently perform numerous and complex functions. Due to the confidential nature of some information or applications stored or displayed on such mobile devices, a security feature is often provided to prevent unauthorized access to confidential information.

In addition to user-initiated security features, most mobile devices have a security time out after a specified period of time. When this time out period expires, a typical handheld or mobile device may either shut down, or a security screen saver application may start. Most mobile device security screen savers show a minimum amount of static information.

There is a need to show selected information pertinent to a mobile device user when a device security screen saver is active. There is a related need to show, on a device security screen saver display, that new or updated information has been received. It is therefore desirable to provide an apparatus or method that will assist in satisfying these needs.

SUMMARY OF THE INVENTION

It is an object of the present invention to obviate or mitigate at least one disadvantage of previous security interface, or security splash screen arrangements, particularly those provided for use with handheld or mobile devices.

According to an aspect of the present invention, there is provided a mobile device having a user interface, a memory and a transceiver coupled to a processor. The device includes a security interface coupled to the processor for facilitating control of user access to data stored in the memory. The data stored in the memory has stored security levels determining secure data and non-secure data, the control being based on the stored security levels. The security interface provides user access to the non-secure data, and restricts access to the secure data based on the stored security levels.

The non-secure data preferably includes user-selected non-secure data, which is preferably automatically updated. The processor and the security interface can co-operate to provide a first state, a second state, and a third state. The first state is activated after a period of inactivity on the device and in which access to the secure data is restricted and access to the non-secure data is permitted. The second state is activated when a user attempts to access the secure data and in which security information is requested from a user. The third state is activated when the security information input by the user is positively verified and in which full access to the secure data is granted to the user.

The data stored in the device's memory can comprise resource information for a plurality of resources, and can preferably further comprise a resource identifier and resource data. The resource identifier can be a uniform resource locator (URL). The security interface can advantageously provide an indication of a change in the secure data without a need for authentication. The user interface preferably includes a display.

According to another aspect of the present invention, there is provided an electronic device having a processor, a user interface coupled to the processor, a memory coupled to the processor for storing non-secure data and secure data, and a communications module coupled to the processor for updating at least some of the non-secure data and the secure data. The device includes a security interface coupled to the processor for facilitating control of user access to the non-secure data and the secure data. The non-secure data and the secure data comprise a security level and the control is based on stored security levels. The security interface provides user access to automatically updated user-selected non-secure data, and restricts access to secure data based on an authentication process.

According to yet another aspect of the present invention, there is provided a security interface for an electronic device having a user interface, a memory and a communications module coupled to a processor. The security interface includes a first data access module for providing non-secure data to a user, an input module for receiving input from a user, an authentication module for authenticating received input to control user access to the secure data, and a second data access module for providing the secure data to a user following successful authentication.

In the security interface, the non-secure data can include user-selected non-secure data, which is preferably automatically updated via the communications module. The security interface can further include a security module for distinguishing between secure data and non-secure data stored in the memory, preferably based on a stored security level. The first data access module can include an indication module for providing an indication that the secure data has changed. The user interface can include a display, with the security interface being displayed on the display. The input module can be coupled to a keyboard for receiving input therefrom.

According to a further aspect of the present invention, there is provided a method of controlling user access to data on a mobile device, the mobile device having a user interface and a memory coupled to the user interface for storing secure data and non-secure data. The method includes the steps of: providing non-secure data via the user interface; authenticating user access to the secure data in response to an authentication request; and permitting user access to the secure data in response to successful authentication.

The non-secure data can include user-selected non-secure data. The step of authenticating can include the steps of: prompting the user to enter security information in response to a user attempt to access the secure information; and comparing the user's security information with predetermined security information, which can be a password. The step of prompting can include displaying a dialog box on the display, and the step of authenticating can include a timeout period within which a user is permitted to attempt authentication.

The user interface preferably includes a display upon which the user-selected non-secure data is displayed in a security interface. The method can further include the step of providing an indication on the display in response to a change in secure data. When the user interface includes a display, the indication can be displayed on a status area of the display.

The non-secure data can be automatically updated, which step can be performed at regular intervals. In the case of user-selected non-secure data, the data can include a plurality of user-selected information types, which can originate from a plurality of user-selected sources.

Additional non-secure data can be displayed in response to a user request for the additional non-secure data. The additional non-secure data preferably relates to the non-secure data previously displayed. The method is preferably initiated after a predetermined period of inactivity on the device, which can be a user-defined timeout period during which there is no input on the device.

A last-accessed screen can be displayed following the step of permitting user access to the secure data. A new message can be opened following the step of permitting user access to the secure data when the indication indicates the presence of the new message. The non-secure data can include static information that is not updated.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached figures, wherein.

DETAILED DESCRIPTION

Generally, the present invention provides a method and device that provide a security interface, preferably for a mobile device. The security interface provides user-selectable non-secure data that is displayed without the need for a password. The non-secure data is preferably updated on a regular basis, and can be obtained from different sources, as selected by a user. The secure data can be accessed after successful authentication, such as a positive password verification. Additional non-secure data, related to the displayed non-secure data, can preferably be accessed, with or without a need for a password. An indication can be provided to inform a user that secure data has been updated, without the need to access such secure data. The security interface is preferably enabled after a predetermined timeout period.

The interface allows the device to operate in three data access states: a controlled access state; a verification state; and a full access state.

Figure 1A:
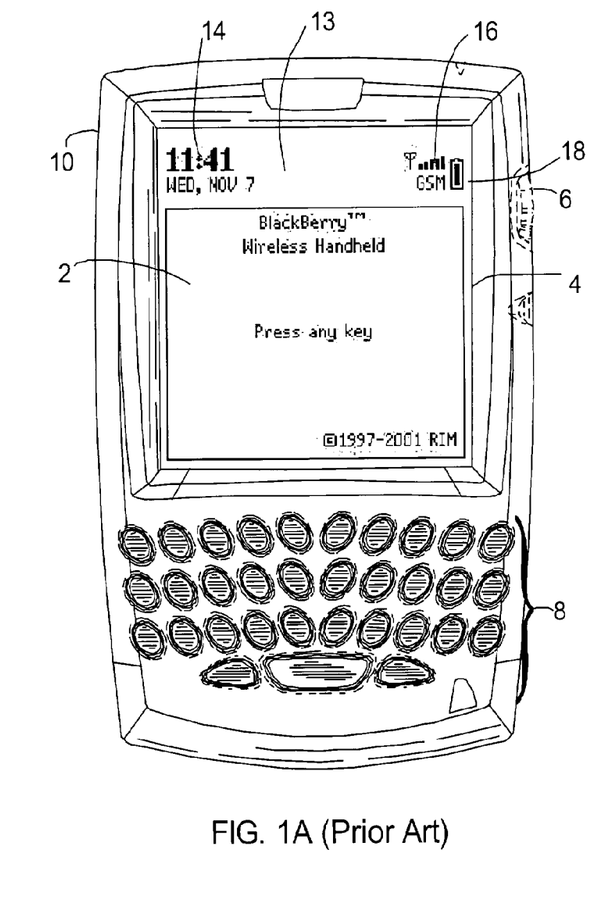
FIG. 1A is a diagram of an existing security interface for a mobile device.

FIG. 1A shows an existing security interface, or screen saver, for a user interface on a mobile device. The user interface 4, preferably comprising a display, preferably exists on a typical mobile device (herein referred to as a device) having an auxiliary input device 6 such as a thumbwheel, and a keyboard 8. Output to the user is provided via the user interface, or display 4. Although the user interface will be described below as comprising a display, it is to be understood that the user interface can additionally comprise any suitable means for facilitating audio or visual communication of information to and from the user.

In this diagram, a security interface 2, or security screen saver, comprises a box occupying most of the display. Above the box is a status area 13 that shows device-related information such as the time and date 14, the signal strength 16, and the battery life 18. The status area 13 may also contain such information as reminders, alerts and new message count. This known security interface 2 shows very little information. In the example of FIG. 1A, the security interface 2 shows a manufacturers trademark, a prompt for the user and a copyright notice. The security interface 2 activates after a period of inactivity on the device.

Figure 1B:
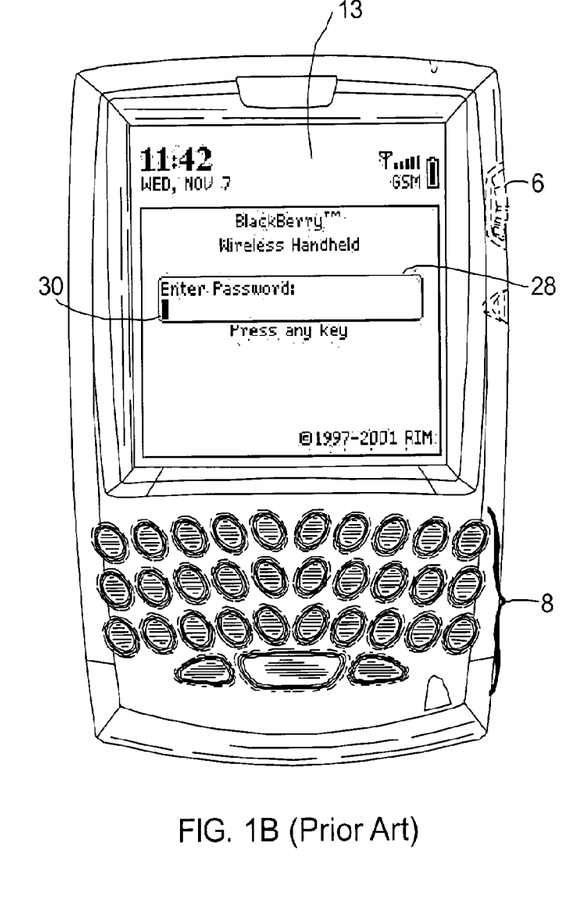
FIG. 1B is a diagram of the existing security interface with a password dialog box.

FIG. 1B shows a password dialog box over the security interface. This dialog box 28 appears when a user has initiated some input into the device. This input can come from the thumbwheel 6 or the keyboard 8. The user is prompted to enter a password in the dialog box 28 at the dialog box prompt 30 in order to access secure or confidential applications or information on the device. In fact, in this case, all information not shown as part of the security screen saver and in the status area is treated as secure or confidential. The password is preferably previously set by a user.

Figure 1C:
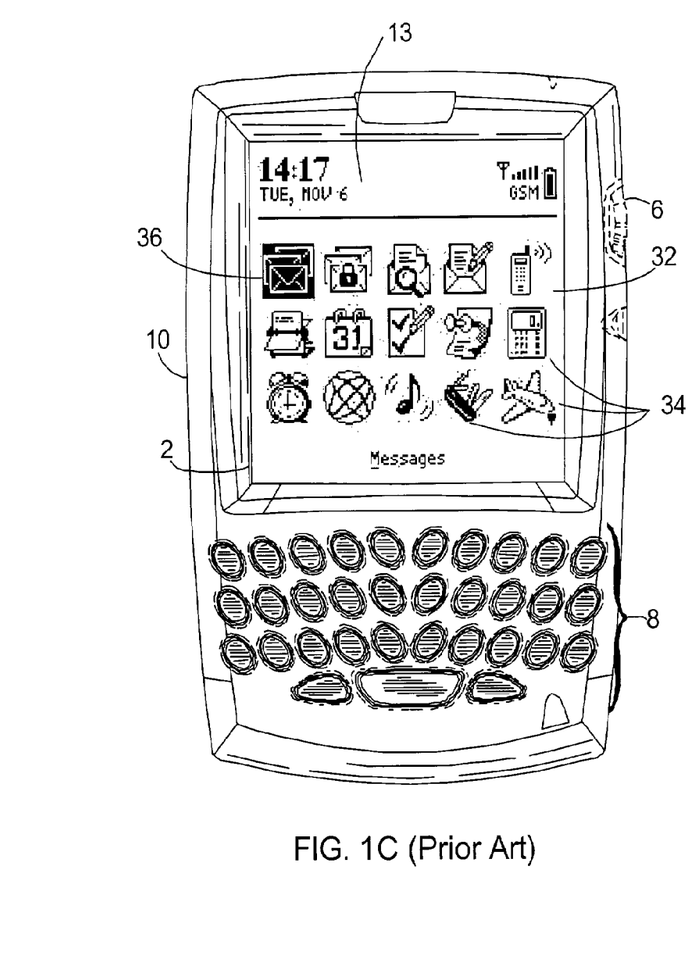
FIG. 1C is a diagram of an existing user interface screen for a mobile device showing an icon ribbon.

FIG. 1C is a drawing of the device once the user has entered the correct password in the dialog box that appears over the security interface. The screen is refreshed and shows an icon menu 32. Each icon 34 represents a software application available to the user. Using the thumbwheel 6, the user may scroll through the icons and highlight an icon, as indicated at 36, for an application, which the user wishes to utilize. In this example, a Message List icon is highlighted.

Figure 1D:
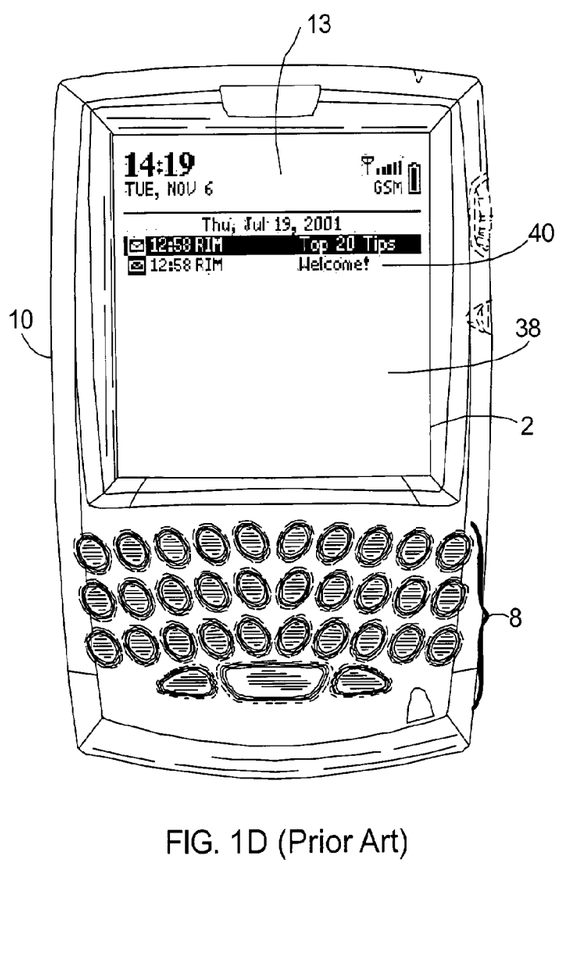
FIG. 1D is a diagram of an existing user interface screen for a mobile device showing a message list application.

FIG. 1D shows a diagram of an existing user interface screen for a mobile device showing a message list 38 generated when the message list application is selected and started. New and read messages 40 appear in the message list 38. The status (new, read) of a message 40 is preferably indicated using different icons, as shown. The information shown in FIG. 1D is made available once the user has entered the correct password in the dialog box that appears over the security interface.

Figure 2:
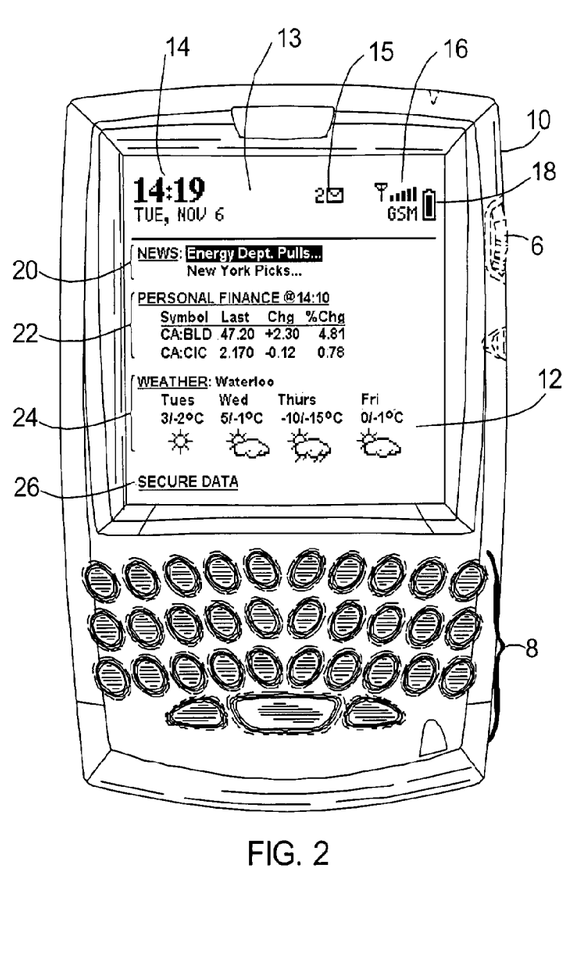
FIG. 2 is a diagram illustrating a security interface for a mobile device according to an embodiment of the invention.

FIG. 2 shows an example of a security interface 12 including user-selected information according to an embodiment of the present invention. The security interface 12 preferably occupies most of the display except for the status area. The status area 13 preferably contains device-related information 14, 16, 18 (as described in relation to FIG. 1A) as well as an indication that secure information that exists beyond the security interface 12 has changed. An example of an indication that secure information has changed is shown in FIG. 2 as a register of new and unread messages 15 that have been received by the device. The indication is preferably provided by way of an indication module, which is preferably implemented in software.

The security interface 12 preferably includes a plurality of types of information 20, 22, 24 that a user can select for display, preferably by establishing security configuration settings. The display of this user-selected non-secure data can be achieved by a data access module, which can be implemented in software. In this example, the user has chosen to display news headlines 20, financial information 22 such as stock quotes, and weather updates 24 for the user's chosen region. The user may choose from a plurality of information sources and types and is not limited to these examples.

When setting up the security interface 12, the user preferably chooses the information that the user wishes to see when a device time out occurs. The user also preferably sets a password to deactivate the security interface 12 when the user wishes to access secure data.

The term secure data is used herein to represent any information or application that has been identified as confidential or deserving some degree of restricted access, either by a user selection or by a default setting. The term non-secure data is used herein to represent any information or application that is not secure data.

The user can choose the source of the non-secure data, or the device may have a default source for the chosen data depending on such criteria as the user's location. This non-secure information is preferably updated on a continuous basis over a wireless network in which the device is configured to operate. Such an update function can be implemented by either an information push method to the device or an information pull method by the device, or a combination of both methods. For example, stock quotes could be automatically pushed to the device by a server computer operating on the Internet or other network, or the device can be configured to periodically submit requests to a news website for current news headlines.

The user can preferably access additional information related to the displayed non-secure data on the security interface 12 by scrolling to an item the user wishes to view. For example, the user may wish to view a story associated with a news headline. If the user scrolls to the desired headline, using the thumbwheel 6, and chooses to access the associated news story, the device preferably displays the story or possibly a portion thereof. A password would not be required because the information is non-secure.

In a particular embodiment, the security interface 12 preferably has a secure data access area 26. If the user wishes to access the secure data, security information must first be correctly entered by a user. In the example shown in FIG. 3, the security information is a password, and is requested from a user via a password dialog box 28, which preferably appears when secure data access area 26 is selected. The user is preferably prompted to enter the user's password in the dialog box 28 at the dialog box prompt 30 in order to access secure or confidential information and applications on the device. The password is preferably set by the user when the user sets the options for the security interface. The prompting for the password, and all other steps relating to authentication, is preferably performed by an authentication module, which can be implemented in software. An input module, also preferably implemented in software, is provided to receive input from the user, such as a password entry. Access to, and presentation of, the secure data is preferably performed by a data access module, which is also preferably implemented in software.

In an alternative embodiment, the secure data access area 26 is absent and access to secure data is achieved by entering a particular input sequence, such as a predetermined set of keystrokes. As such, although the secure data access area 26 may not appear on the display, access to the secure data is still available after entering the particular input sequence. The input sequence can preferably be user-defined for added security. Such an arrangement hides the fact that secure data can be accessed on the device, unless the user is aware of the functionality. This can prevent unauthorized users from attempting to access secure data.

As described above, the status area 13 preferably includes an indication that secure data has changed, such as new message indicator 15. A device user can thereby determine whether or not secure data protected by the password has changed without having to enter the password, thereby saving the user both time and effort to merely check for new or updated secure data. Other indicators of changes in secure data on the security interface 12 or in the status area 13 may include indicators for voice mails, SMS messages, and calendar updates, as well as other secure data that may be updated.

In an alternative embodiment, entry of the password is required for the user to access additional information related to the displayed non-secure data on the security interface 12. The dialog box preferably appears once the user scrolls to an item the user wishes to view.

When the user has entered a password, the password is verified to ensure that it is the correct, previously set device password. Once the entered password is positively verified, then access to the secure data is granted. Otherwise, the user may be prompted to re-enter a password, preferably until either the password is positively verified or the user has incorrectly entered the password a predetermined number of times. In the case of a negative result of password verification after the predetermined number of tries, the user may be prevented from accessing secure data for a predetermined period of time, or until a particular action is taken. This is common in GSM devices, where a SIM card can be used to lock out access to a device after repeated incorrect password entry.

Figure 4:
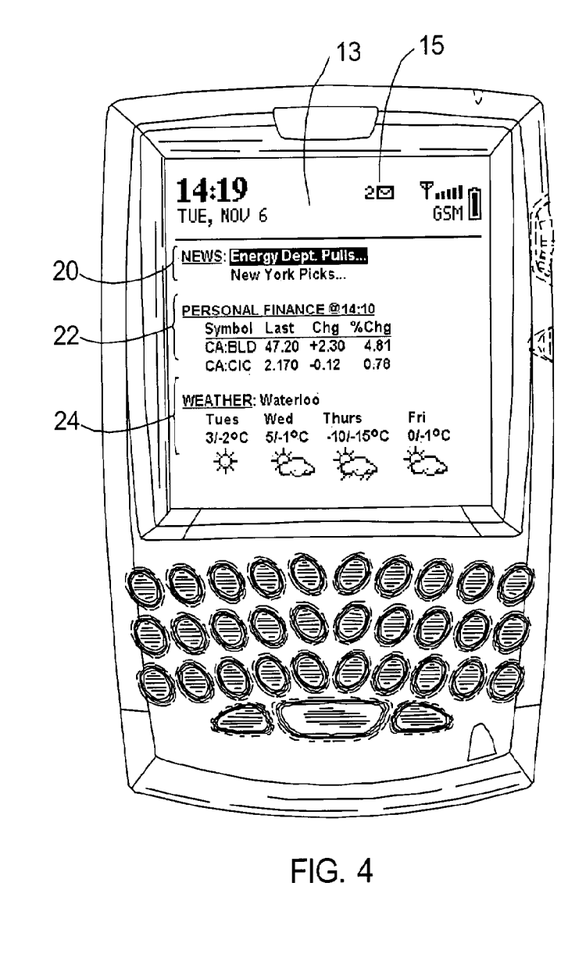
FIG. 4 is an alternative embodiment of the security interface of the present invention.
Figure 5:
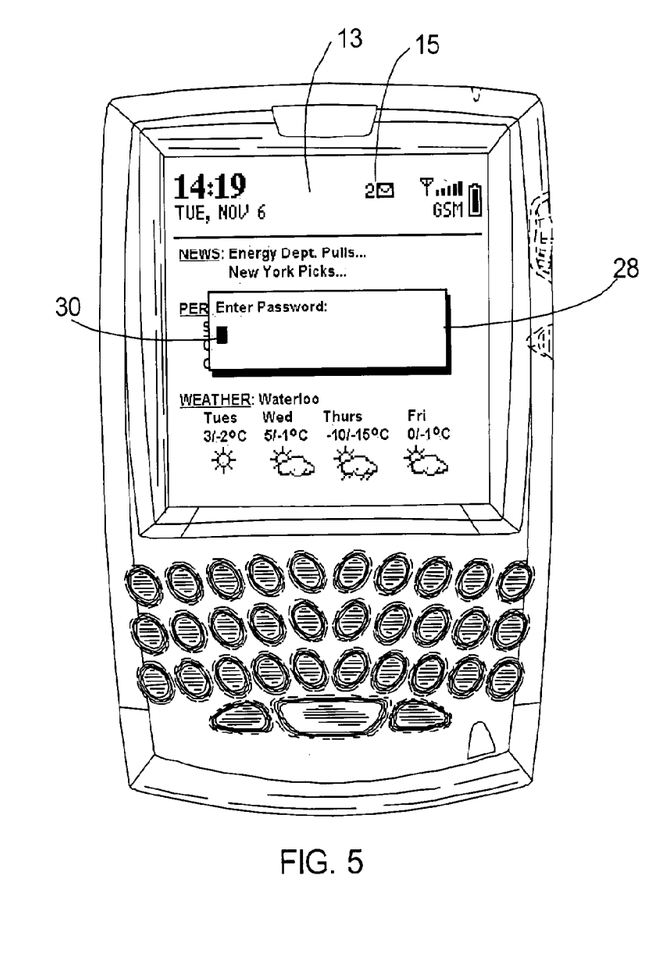
FIG. 5 is diagram showing the alternative embodiment of the security interface with a password dialog box.

FIG. 4 shows another embodiment of the security interface. In this embodiment, access to all information not shown on the security interface or status area on the device is restricted. If the user were to select an information item 20, 22, 24 on the security interface that the user wishes to explore further, then the password dialog box 28 would preferably appear as shown in FIG. 5. Therefore, in this embodiment, additional information related to non-secure data is treated as secure data. The password dialog box 28 would also appear if the user wished to access secure data, such as any new received messages indicated by the message indicator 15, and software applications.

Figure 6:
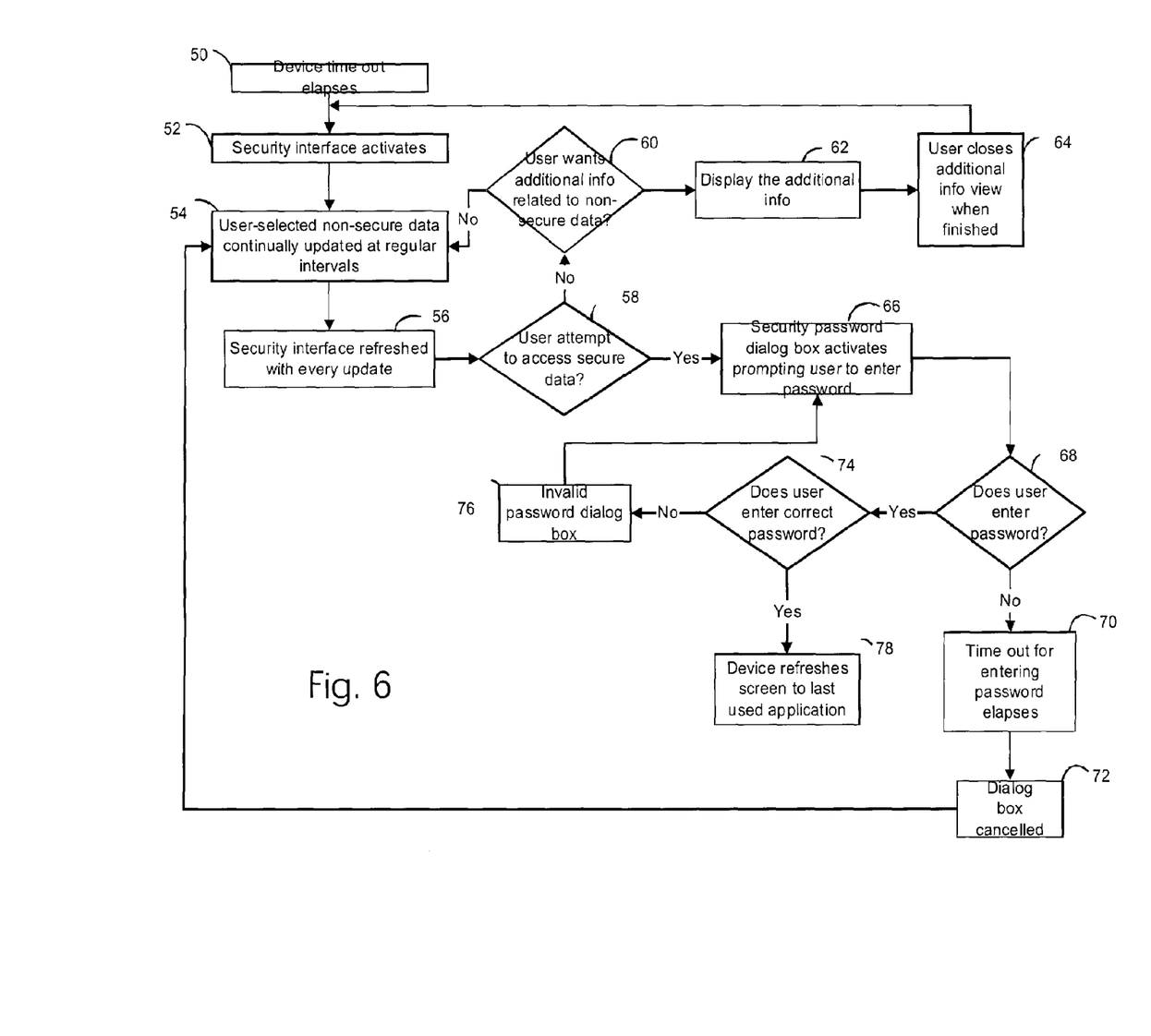
FIG. 6 is a flow diagram showing a method for activating and updating the security interface according to an embodiment of the present invention.

FIG. 6 is a flow diagram showing a method for activating and updating the security interface. A device preferably has a time out security feature. This feature may be enabled and disabled by the user and allows the device to enter a first state, or controlled access state. In this first state, access to secure data on the device is controlled after a period of time elapses in which there is no activity on the device, e.g. no user input. This timeout period is preferably user-selectable. In step 50, the timeout period elapses. The security interface is activated in step 52, preferably in response to a user activating the device, e.g. turning on a power button.

Non-secure user-selected information preferably appears in the security interface, which is preferably updated automatically in step 54. In step 56, the security interface is refreshed with each update. Updates may be, for example, at regular intervals, at particular times of day, or whenever information at a source changes. Other update timings are also possible without departing from the scope of the present invention. Security interface information is preferably updated as new or updated information is received.

Figure 3:
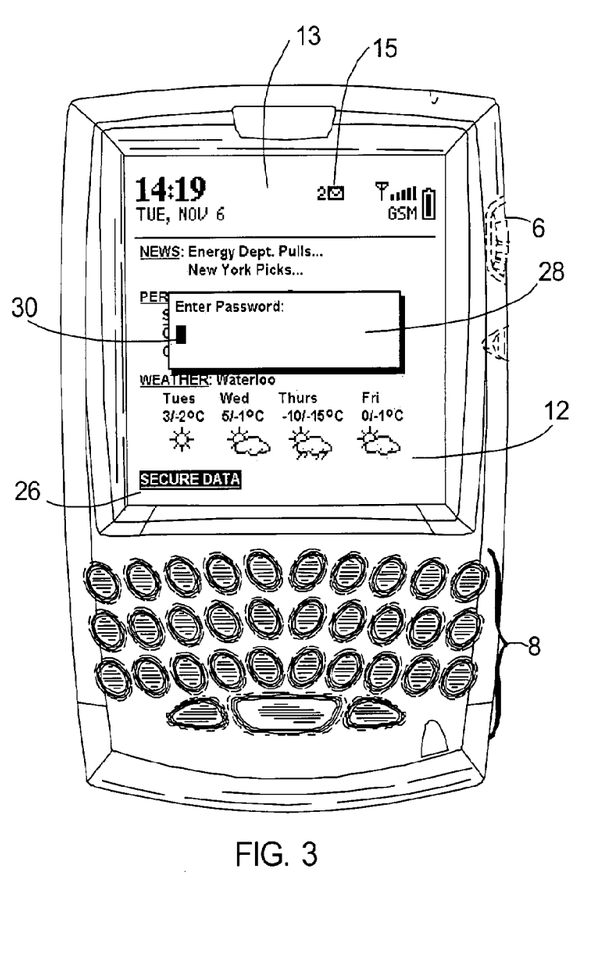
FIG. 3 is a diagram showing the security interface of FIG. 2 with a password dialog box.

When the device is in its first state, the security interface would be substantially as shown in FIG. 3 or FIG. 5. It should be apparent that a security interface may include both information that is refreshed and updated in accordance with an aspect of the invention, as well as some static information. In FIG. 3 for example, the heading "NEWS:" may be static, whereas the headlines may be updated.

In step 58, the user attempts to access secure information. Although this step is shown in FIG. 6 at this point in the method, this step may take place at any point after the security interface has been activated. If the user does not attempt to access secure information, the device determines whether the user wishes to access additional information related to displayed non-secure data (step 60). If the device determines that the user does want more detail, then, in step 62, the device will preferably display more detail in a new screen. In step 64, the user will exit the detail screen when finished and the security interface will activate again. If, in step 58, the device determines that the user did not wish to access more detail, then the device will preferably continue to display the security interface with the continual updates.

If the user does attempt to access secure data, then the device preferably enters a second state, or security verification state. In this second state, a security password dialog box preferably activates and prompts the user for verification in order to enter the user-set password in step 66. The security interface will appear substantially as shown in FIG. 3 or FIG. 5 when the device is in its second state.

In step 68, if the user does not enter a password, then in step 70, a time for entering the password will elapse and in step 72, the dialog box will be cancelled and the device preferably returns to the first state. The device then continues with displaying and refreshing the security interface with updated user-selected information.

If the user does enter a password, the device determines whether the user has entered the correct password in step 74. If the user does not enter the correct password, then in step 76, a dialog box preferably appears warning the user that the password submitted was invalid. The device then preferably displays the password dialog box again. In an alternative embodiment, the device may also limit the number of times the user may re-enter the password incorrectly, to thereby provide a further security feature.

If the user does enter the correct password in step 74, then the device preferably enters a third state, or full access state. In this third state, the device deactivates the controlled access state by exiting the security interface and refreshing the device display, preferably to the last application used by the user before the device time out (step 78). As a default setting, the device may refresh the display to a main icon menu such as shown in FIG. 10.

In a further embodiment, the device automatically opens a new message when the user enters the correct password to deactivate the security interface after a new message notification, such as 15 (FIG. 2) for example, is generated by the device.

Figure 7:
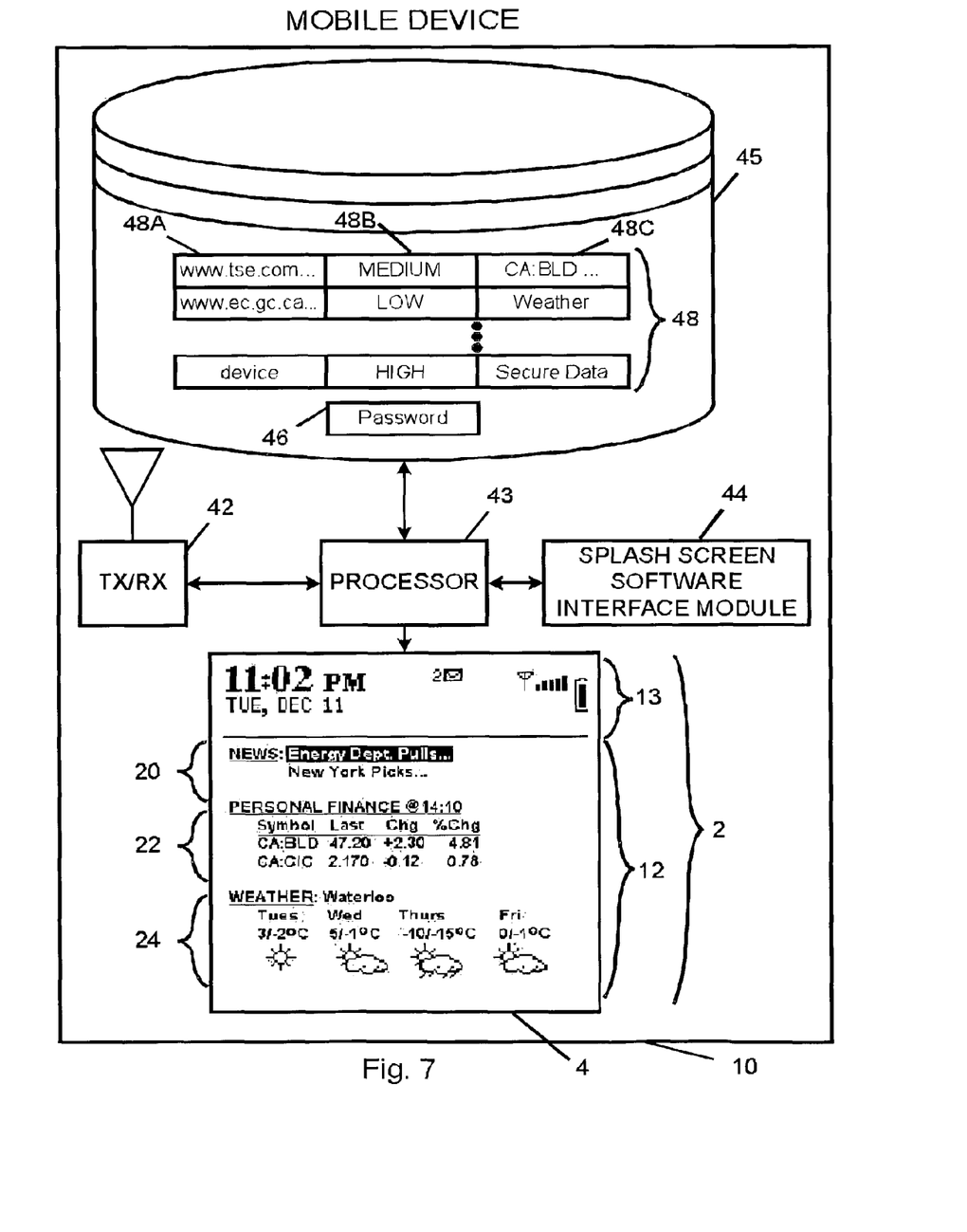
FIG. 7 is a block diagram illustrating a mobile device according to an embodiment of the present invention, including a security interface.

FIG. 7 is a block diagram illustrating an electronic device according to an embodiment of the present invention, including a security interface. FIG. 7 shows a representation of an electronic device 10, such as a mobile device according to an embodiment of the present invention. The device includes a user interface 4; a processor 43; a communication module 42, such as a transceiver; and a memory 45. The user interface 4 preferably comprises a display, in which case the display preferably comprises two sections: the security interface 12 and the status area 13. The device also includes a security interface software module 44 that is executed by the processor 43. The security interface software module stores resources 48 in the memory 45, and can be implemented in software and itself be stored in the memory 45 or another memory. The memory preferably stores data including secure data and non-secure data. Some of the data stored in the memory can be divided into individual resources 48.

The security interface software module 44 preferably saves and indexes resources transmitted or received by the device 10 as well as electronic resources local to the device. In an alternative embodiment, the security interface software module 44 may allow the user to select resources to save or discard.

Each stored resource 48 preferably has a resource identifier or locator 48A, a security level 48B, and resource data 48C. The locator 48A, which may be a Uniform Resource Locator (URL), is used to provide a source from which to update the resource data 48C via the transceiver 42. The security level 48B preferably determines whether the resource data 48C may be shown on the security interface 12. A security module is preferably provided for distinguishing between secure data and non-secure data stored in the memory based on the stored security levels.

The security level 48B may also determine whether accessing further information or updates to the resource data 48C requires a user to enter a password 46 for verification in order to show confidential information. For example, if the user wishes to view information like the weather, the password is not required because the security level is set to low. However if the user wishes to view Secure Data, the password is required because the security level is set to high. The password 46 is preferably stored in memory 45. When a user enters a password, the device will compare it to the stored password 46.

In FIG. 7, the locators 48A are URLs used to conditionally update the resource data 48C displayed on the security interface 12 as user-selected information elements 20, 22, and 24. The resource data 48C may be updated on the device 10 either by a push method to the device or an information pull method by the device 10 via the transceiver 42 over the wireless network.

The invention can also be implemented in handheld communication devices, personal digital assistants (PDAs) with communication functions, cellular telephones, wireless modems and one-way or two-way pagers, or any other mobile communications device or electronic device using a password-accessed screen saver to prevent access to secure data while allowing access to non-secure data.

Although the communications module in FIG. 7 is illustrated as a transceiver, it may be any means suitable for updating resource data. For example, in the case of an electronic device that is not a wireless device, the communications module can include an interface card, such as an Ethernet card. Also, the user interface can include not only a display, but also any other means by which the user can interface with the resource data. These can include a microphone or speaker, a keyboard or keypad, a thumbwheel, or any other means allowing for either user input or communication of information to a user.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of controlling user access to data on a mobile device having a wireless transceiver, the method comprising:
   receiving, via the wireless transceiver, non-secure data and secure data from one or more data sources via a wireless network;
   restricting, via a security interface of the mobile device, user access to secure data while allowing user access to non-secure data, secure data including data protected by restricted access, and non-secure data including data that is not secure data;
   segmenting the security interface into a status area and a security area;
   automatically displaying, via the security area, the non-secure data received via the wireless network, without requiring user authentication;
   automatically displaying an indication, via the status area, that secure data has been received from the one or more data sources, without requiring user authentication;
   displaying, via the security area, received secure data responsive to receiving successful authentication, wherein, when the indication indicates that received secured data comprises a new message, displaying the received secure data further comprises automatically opening the new message responsive to receiving successful authentication;
   automatically redisplaying, via the security area, the non-secure data received via the wireless network following expiration of an inactivity time period such that the received secure data is no longer displayed on the security interface;
   receiving, via the security area, a user request for additional data related to certain non-secure data displayed via the security area; and
   selectively displaying, via the security area, additional data related to the certain non-secure data.

2. The method of claim 1, further comprising:
   allowing user access to secure data upon successful user authentication.

3. The method of claim 1, further comprising:
   allowing user access to secure data upon receipt of correct security information.

4. The method of claim 3, wherein the correct security information includes a particular input sequence.

5. The method of claim 3, wherein the correct security information includes a password.

6. The method of claim 3, wherein the correct security information is user-defined.

7. The method of claim 1, wherein the non-secure data includes news information.

8. The method of claim 1, wherein the non-secure data includes financial information.

9. The method of claim 1, wherein the non-secure data includes weather information.

10. The method of claim 1, wherein the non-secure data is based on location.

11. The method of claim 1, further comprising:
    updating, via the security interface, the non-secure data, without requiring user authentication.

12. The method of claim 1, wherein the security interface comprises a device security screen saver interface activated upon expiry of a specified period of time.

13. The method of claim 1, wherein automatically opening the new message comprises displaying the new message responsive to receiving successful authentication.

14. The method of claim 1, wherein the security interface includes user-selected information.

15. The method of claim 1, wherein automatically opening the new message responsive to receiving successful authentication comprises displaying the new message without requiring user selection of the new message.

16. The method of claim 15, wherein the new message comprises an email message or a Short Message Service (SMS) message.

17. The method of claim 1, wherein additional data related to the certain non-secure data is treated as secure data regardless of whether the additional data comprises secure or non-secure data.

18. The method of claim 17, further comprising:
    requiring user authentication responsive to receiving the user request for additional data related to certain non-secure data; and
    displaying the additional data related to the certain non-secure data responsive to receiving successful authentication.

19. A mobile device, comprising:
    a wireless transceiver enabled to receive non-secure data and secure data from one or more data sources via a wireless network; and
    a security interface enabled to:
      restrict user access to secure data while allowing user access to non-secure data, secure data including data protected by restricted access, and non-secure data including data that is not secure data,
      segment the security interface into a status area and a security area;
      automatically display, via the security area, the non-secure data received via the wireless network, without requiring user authentication;
      automatically display an indication, via the status area, that secure data has been received from the one or more data sources, without requiring user authentication,
      display, via the security area, received secure data responsive to receiving successful authentication, wherein, when the indication indicates that received secured data comprises a new message, displaying the received secure data further comprises automatically opening the new message responsive to receiving successful authentication;
      automatically redisplay, via the security area, the non-secure data received via the wireless network following expiration of an inactivity time period such that the received secure data is no longer displayed on the security interface; and
      receive a user request for additional data related to certain non-secure data displayed via the security area;
    the wireless transceiver being further enabled to receive additional data related to the certain non-secure data; and
    the security interface being further enabled to selectively display the additional data.

* * * * *